United States Patent [19]

Avery

[11] Patent Number: 4,982,872
[45] Date of Patent: Jan. 8, 1991

[54] FILM-ENCAPSULATED-STRUCTURE CONTAINER FOR FOOD, BEVERAGES AND OTHER CONSUMABLE PRODUCTS AND METHOD FOR MAKING OF SAME

[76] Inventor: Donald J. Avery, 2129 Park Forest Dr., Chesterfield, Mo. 63017

[21] Appl. No.: 284,686

[22] Filed: Dec. 15, 1988

[51] Int. Cl.$^5$ .......................... B65D 5/56; B65D 25/14
[52] U.S. Cl. .................................. 220/461; 220/450; 220/451; 229/3.1; 229/4.5
[58] Field of Search ............... 220/450, 460, 461, 462, 220/463, 464; 229/2.5 R, 3.1, 4.5

[56] References Cited

U.S. PATENT DOCUMENTS

| | | | |
|---|---|---|---|
| 3,055,568 | 9/1962 | Zalkind | 220/461 |
| 3,370,773 | 2/1968 | Mayo | 220/461 |
| 3,401,863 | 9/1968 | Earl | 229/2.5 R |
| 3,515,331 | 6/1970 | Guthrie | 220/450 |
| 3,834,606 | 9/1974 | Andersson | 229/2.5 R |
| 3,885,730 | 5/1975 | Christensson | 220/450 |
| 3,902,651 | 9/1975 | Marshall | 229/3.1 |
| 4,373,643 | 2/1983 | Pryzytarski | 220/450 |
| 4,525,396 | 6/1985 | Takansa | 229/3.1 |
| 4,679,724 | 7/1987 | Inagaki | 220/461 |
| 4,679,844 | 5/1987 | Clauss | 220/451 |

Primary Examiner—George E. Lowrance
Attorney, Agent, or Firm—Kalish & Gilster

[57] ABSTRACT

A sheath-encapsulated primary and secondary container for food, beverage and consumable products employs a structure to protect the contents of the container against the stresses of processing, filling, warehousing, distribution, merchandising and customer use. The structure is formed of paper-based or polymeric or other material to be encapsulated so that it may be re-used or recycled and need not be of food-grade or virgin type. A sheath encapsulates the structure and is of film material such as polymeric barrier material, providing sheath portions extending over the exterior of the structure and at least partially internally thereof, the internal sheath portion defining a vessel within the structure for receiving the contents. The sheath interposes a barrier between the structure and the contents, and also provides barrier between the structure and outside environment. Various container configurations, including multiple compartment, and reshipper types, are disclosed.

Methods of forming such encapsulated containers are disclosed.

35 Claims, 4 Drawing Sheets

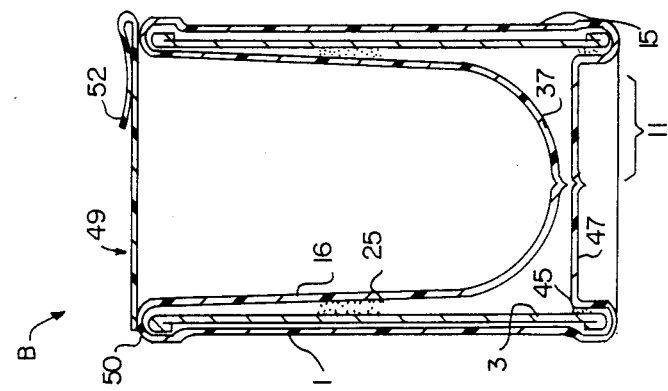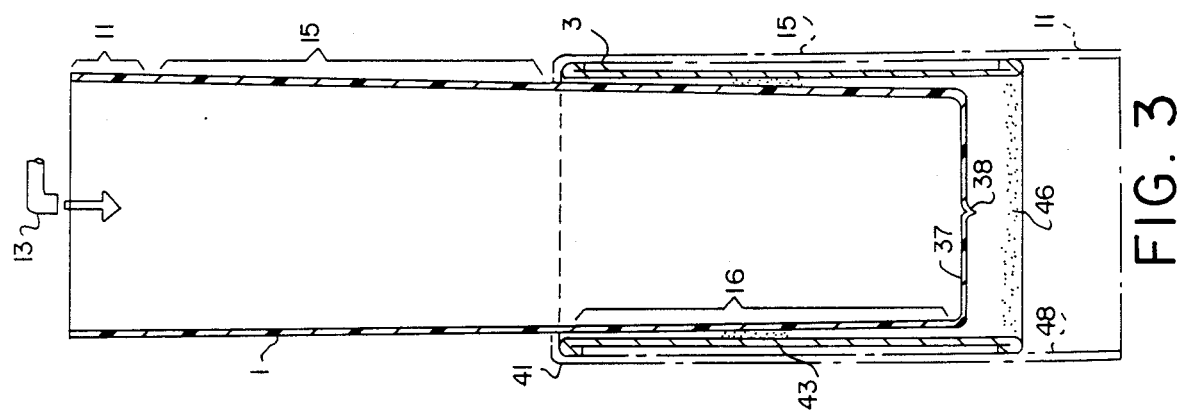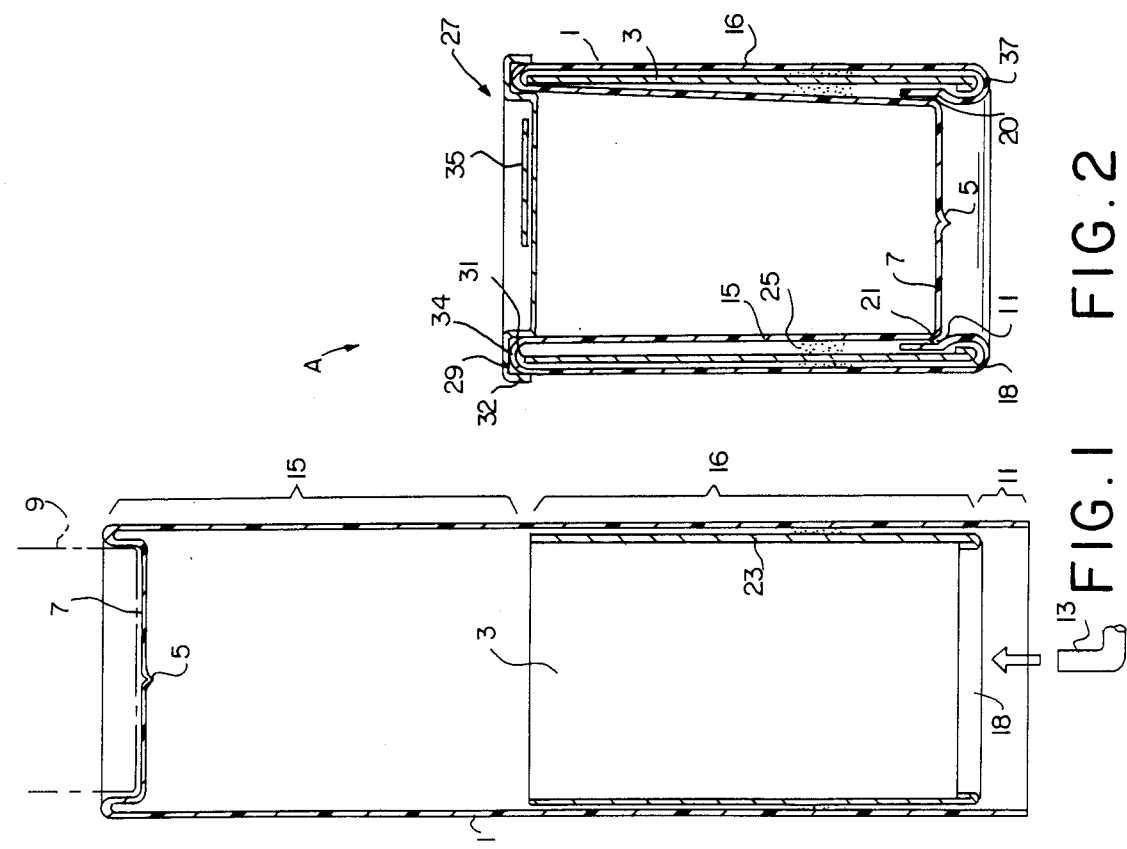

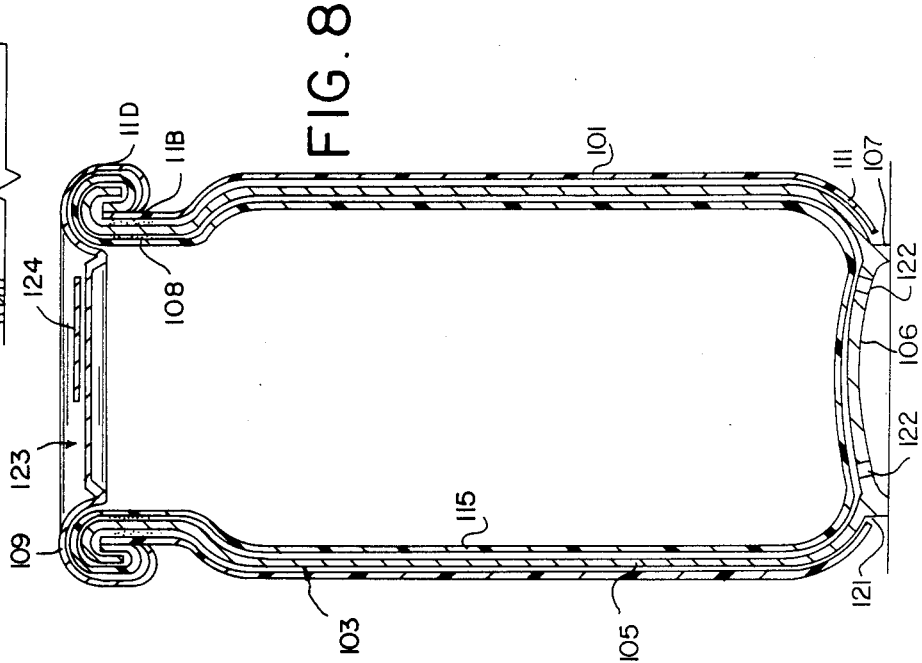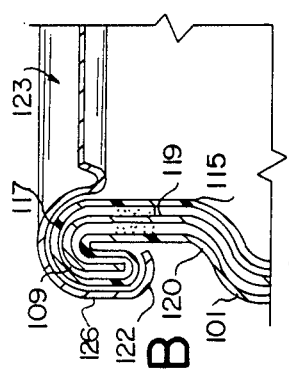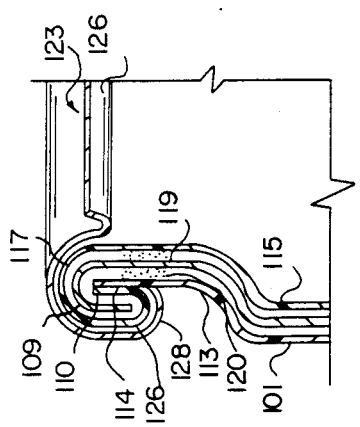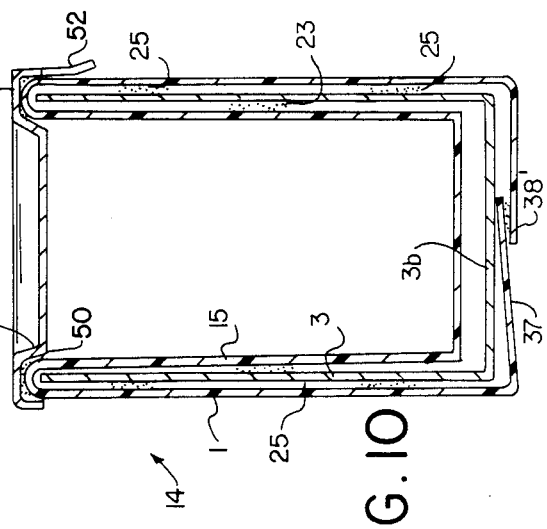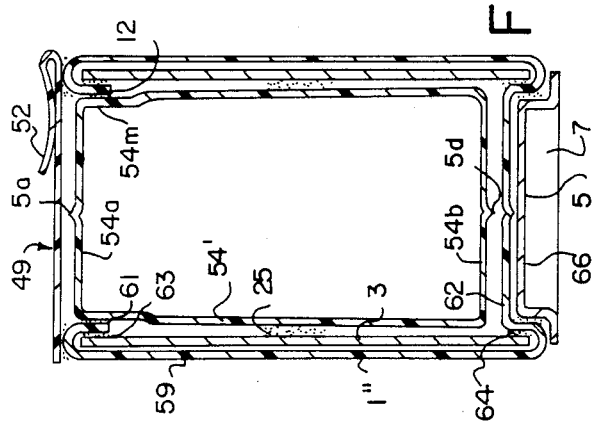

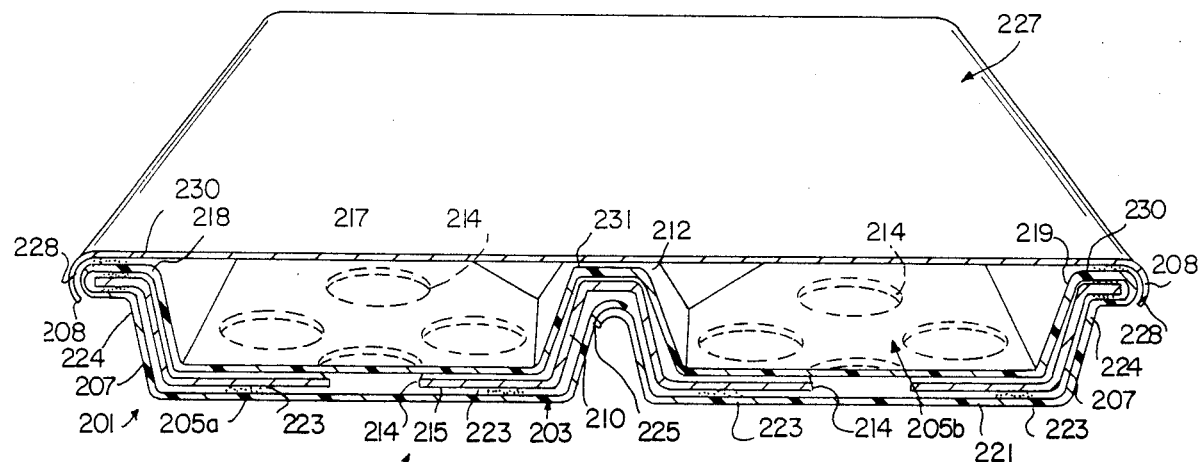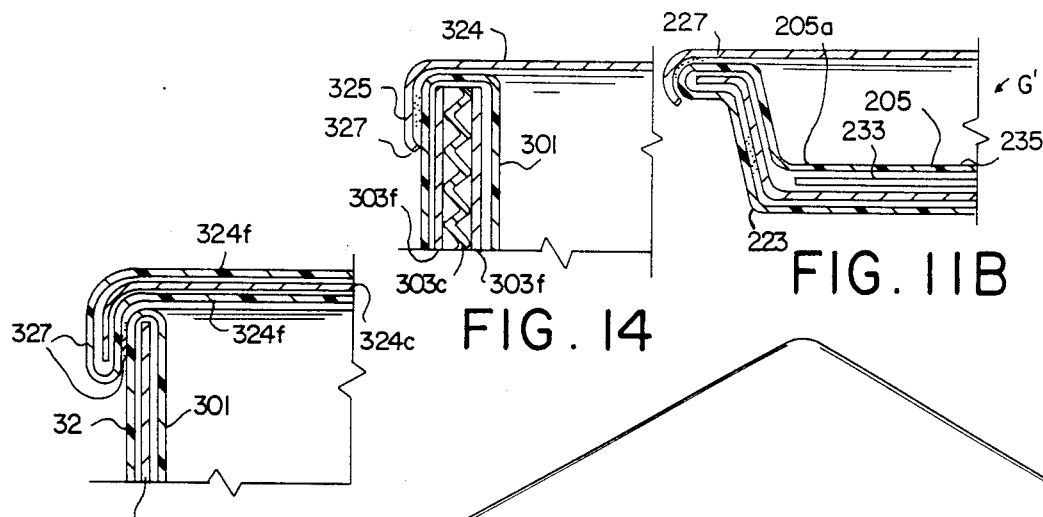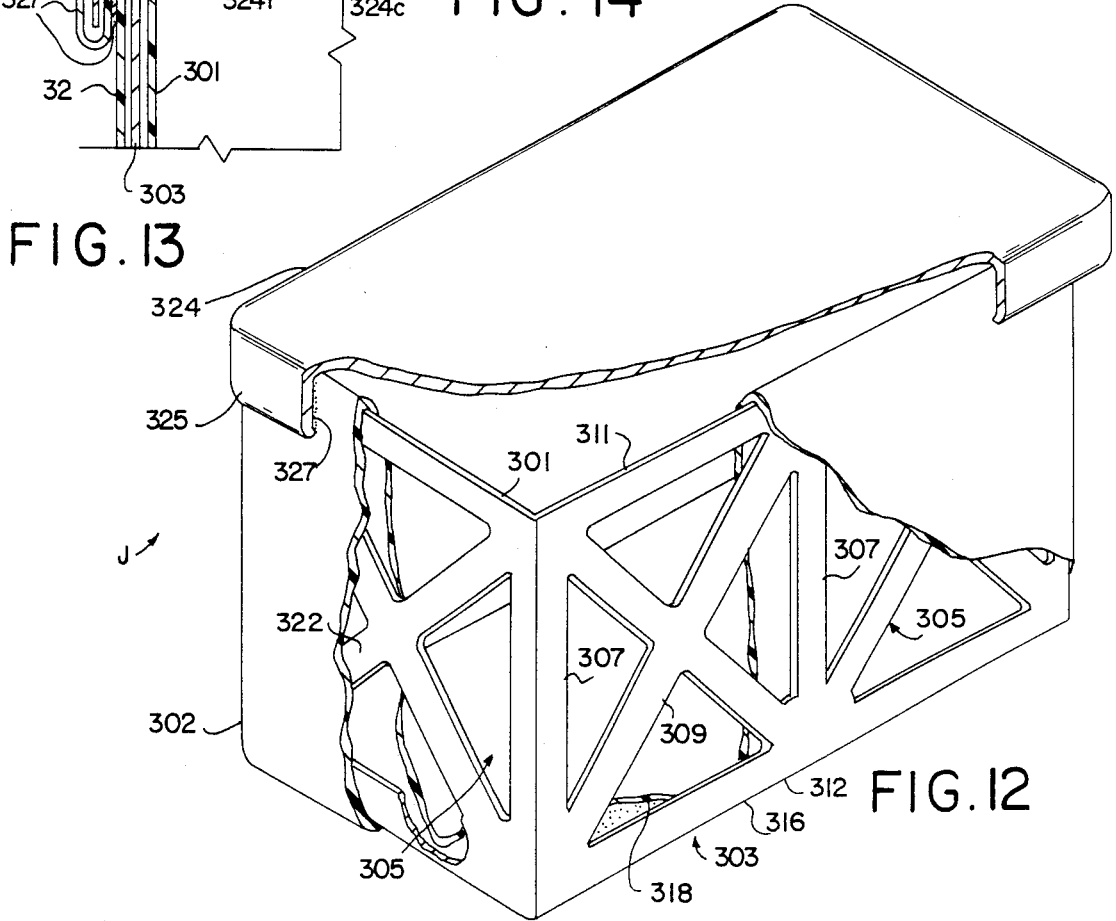

FILM-ENCAPSULATED-STRUCTURE CONTAINER FOR FOOD, BEVERAGES AND OTHER CONSUMABLE PRODUCTS AND METHOD FOR MAKING OF SAME

BACKGROUND OF THE INVENTION

This invention relates to improvements in primary and secondary containers for food and beverages and other consumer products which must be packaged in a sealed condition to protect the product against air, other gases, and/or moisture as well as to provide physical protection during filling, processing, warehousing, distribution, merchandising and customer use.

The invention is extremely well suited for but not limited to the packing of hermetic-packed products which are sensitive to or effected in some adverse way by oxygen or other gases, moisture and/or light. Such products include but are not limited to foods and beverages and other products which hretofore have been hot-filled, cold-packed, frozen, aseptically prepared, pasteurized, retorted, high-temperature, short-time (HT-ST) packed, etc., and otherwise processed. Containers of the invention are also useful for packaging of atmosphere-packed products such as, for example, motor oil, industrial and consumer products, lotions, medicines, wet or dry chemicals, cleaners, cleansers, automotive supplies, and so on.

In the food, beverage and consumer goods packaging industry, the costs associated with conventional containers, whether made of metal, plastic, glass, paperboard, composite, or of single-layer or multilayer materials, are a continually pressing concern because of cost and disposability concerns. Thus, materials cost, vicissitudes of the economy and other major forces of the market place, such as environmental concerns, require extreme reduction in the costs of such containers.

Also, in food and beverage packaging specifically, there has been an increase in the utilization of so-called barrier plastics which provide increased resistance to water vapor transmission and the permeation of various gases. Among such materials which have been made commercially available as single layer (monolayer) or multiple layers for food beverage packaging are polymeric coextruded or laminated sheet and film material such as commercially available under the designations "EVAL" (or "EVOH") (ethylene vinyl alcohol copolymer). High barrier materials of utility are PET film (MYLAR), polyvinylidene chloride (PVDC), and a new class of barrier resins formed of amorphous nylon known as "SELAR PA". Other materials having certain barrier capabilities are high density polyethylene (HDPE), ultra high molecular weight polyethylene (UHMWPE), polypropylene (PP) and oriented polypropylene (OPP), not to mention high impact and other low to medium barrier materials such as polystyrenes (PS) as well as various copolymers such as, for example, acrylonitrile butadiene-styrene (ABS), and high nitrile barrier resins including styrene acrylonitrile (SAN), "BAREX" polymer and polyethylene terephthalate (PET and PETG). Moreover, there are also commercially available a combination of materials with barrier monolayers or employing relatively low barrier materials, such as low density polyethylene (LDPE), HDPE, PP, and HIPS.

One of the greatest economic barriers to the introduction of combinational containers utilizing such plastics has been the requirement that they be constructed of so-called food grade or virgin material. There are, on the other hand, recycled materials not presently used for practical reasons which could be utilized for the making of containers if it were not for the requirement that such containers be utilized in a manner which would expose food and beverage products to their contacting such materials. Thus, for example, one could in theory utilize scrap polymers such as recycled PP and PET, PETG, SELAR and recycled paper-based materials, except that there has not existed heretofore any kind of food container technology or process technology which truly makes practical and/or economic encapsulation of such low-cost materials into a container suitable for packaging and containment of foods and beverages. Nevertheless, the attraction of utilizing such low-cost polymeric materials as well as metal, glass, paperboard and composites is very great because of the extraordinary economy of using such materials, including recycling or re-using such materials, for food and beverage containers as compared with conventional food grade container polymers and specifically the high barrier materials.

As a practical matter, the utilization of the above-noted materials poses also an economic barrier because the formation of containers made by forming container walls of materials with thicknesses adequate to survive the rigors and stresses of processing, filling, warehousing, distribution, merchandising and customer use provides a container which is in fact too expensive for the competitive environment in the domestic and world market for such containers.

Thus there has been long-standing, unresolved problems of the cost in utilizing such expensive materials in adequate thicknesses, in providing such containers with acceptable disposability characteristics, and with capability for recycling and reuse of materials.

From a structural viewpoint, numerous kinds of materials offer advantages for overcoming some of these problems in the construction of food and beverage containers. Although they may lack food-grade properties, and these include paperboard, whether virgin or recycled, various low density plastics, metal, glass and recycled plastic materials such as, for example, the aforementioned PE, PP, PET, PETG and SELAR, etc. However, if such materials are to be utilized to advantage, there must be found a method of inexpensively interposing a barrier between such structural materials and the products to be contained. Paper-based materials have inherently high strength such as to be useful for containment of inner compartments, pouches or linings which enclose a food product, for example. However, such paper-based outer materials are not easily protected from moisture. Heretofore there has been a problem in filling and processing in that packages utilizing paperboard or primarily paper-containing materials have experienced weakening in the strength of the structural components thereof to cause collapse, delamination, deformation and compromise in strength generally.

As compared with other materials of which containers may be formed, paper, such as in the form of layers of wound paperboard, is the least expensive. Since paper is a semisynthetic product made by chemical processing cellulosic fibers, such as from various sources including mainly soft woods but also sometimes hard woods as well as other raw organic materials, including flax, bagasse, straw, etc., it is the ultimately preferred material from an environmental viewpoint. It permits recycling of organic source materials, including waste products, and is both incinerable as well as biodegradable. By contrast, most synthetic resin materials are poorly biodegradable. Metals are not easily incinerated and only low carbon steel is biodegradable through oxidation, whereas aluminum is so expensive and limited in availability that it should not merely be discarded after use. Even though aluminum is being increasingly recycled, a terrible wastage occurs through discarding and wasted burial of aluminum containers which slip through recycling efforts. Paper materials, on a pound-to-pound basis, are also among the strongest available container materials, providing extremely high tensile strength coupled with resilience, as desirable for container manufacturing.

Despite the availability of such materials, it is believed that the packaging industry has failed to address the needs and concerns to which the present invention is directed; the packaging industry has developed around standardized production, concentrating on the high volume, low-cost continuation of existing technologies and endeavoring to protect existing markets.

Although there are a number of different packaging and material technologies, including polymers and resins, composite cans, metal containers, flexible packages, as well as glass, these are all separate bodies of knowledge, materials experiences, science and art. Those in the plastic container industry have not paid sufficient attention to the economics and advantages of combining plastics with other forms of packaging or materials. In the packaging materials industry, there has been a tendency to maintain the status quo because of concerns for labor, capital and costs, and competition.

There is a need for a new generation of low-cost containers capable of providing the full functions which consumers demand or expect from the containers.

SUMMARY OF THE INVENTION

Among the various objects of the present invention are to provide a primary and secondary containers for the containment of food, beverages, and other consumable products which require packaging in a sealed condition. It is thus an object of the invention to provide a container which, although being contents protecting and including the capability of protecting the container and its product against the stresses of processing, filling, warehousing, distribution, merchandising and customer use, is capable of providing the required barrier protection for the products against permeation through the container of water vapor or gases of greater than desirable and maximum permissible permeation rates.

It is further an object of the invention to provide such a container providing an economy of materials cost and manufacturing cost which has never here before been obtained in such containers, particularly those utilized for food, beverage and other consumable products packaging.

It is also another object of the present invention to provide such a container which makes possible the utilization of virgin or non-virgin or recycled low cost materials which have not before been utilized effectively and economically in food, beverage and consumable product containers such as, for example, paperboard, plastics, and recycled materials of various types, including recycled metals, glass and polymers such as PE, PP, PET, SELAR, PETG and nylon, etc.

Among still other objects of the invention may be noted the provision of such a container which is of extremely lightweight character, utilizing an absolute minimum amount of materials, yet capable of demonstrating strength adequate for the protection of the product and container through such stresses as identified above; which container can utilize thermoplastics and other materials which offer materials cost and processing economies; and which lends itself to the use of structural elements which are formed with perforated or other area-relieved construction in order to eliminate the presence of material where it is not required for a structural purpose, thus eliminating the material cost for such eliminated material, while making also possible an extremely light weight construction.

A further object of the invention is to provide a container in which the traditional container functions of contents-barrier protection and container stresses protection are functionally separated between structure and vessel components of the container without compromise of strength or protective capabilities. It is a related object of the invention to provide such a container which uses materials for providing structural characteristics which are the most inexpensive materials available, wherein the bulk of such structural material provides protection against the stresses which the container must encounter in normal use, while utilizing for the vessel a material which is of thickness requisite only for providing protection against the intrusion of contaminants and undesirable permeation of water vapor and gases such as carbon dioxide and oxygen. That is to say, the container is intended to provide for the prevention of oxygen and oxygen permeation into the container, which might spoil a product which oxidizes or otherwise spoils in the presence of oxygen, as well to retain in the container gases intrinsic in a product, such as carbon dioxide (as in beer or carbonated beverages), which might diffuse or otherwise permeate through the walls of the container. It is a related object of the invention to provide such a container wherein barrier materials are not utilized for structural aspects of the invention, but can be instead limited to the vessel component which can thereby be formed with thinness not heretofore desirable or practical, as for example, for containers intended for food, beverages and other consumable products. Such a container has the further goal in that because the functions of barrier protection and functional strength are separated stresses in the functional aspect of the container do not compromise the product protection provided by the vessel component. That is, stresses on the structural component do not adversely affect the vessel component, and vice versa.

Another object of the invention is the provision of such a container which utilizes materials which are more "environmentally friendly" such as, for example, in being more readily and easily biodegradable than existing synthetic containers, and which alternatively makes possible the use of materials which can be recycled and/or reused again and again in order to minimize the amount of waste in landfills, or as a further alternative readily permitting incineration without risk or the introduction of contaminants into the atmosphere. Such a container provides the further object, in accordance with the goal of the invention, of permitting a structural component of non-virgin material which can be easily separated (as for permitting recycling or reuse) from the vessel component which may be, for example, of virgin material which easily can be incinerated.

It is an object of the invention to provide a container in which either or both the vessel component and structural components may be of either virgin or non-virgin material, and wherein the specific nature of the one of the components, such as the material of the vessel component, does not dictate the material to be used for the other component or its characteristics.

It should also be noted that an object of the invention is the provision of such a container which allows economical, highly functional closures which can readily be opened but do not compromise the security of the package and are tamper-resistant and tamper-evident.

Another object of the invention is to provide a container which can be used as a secondary container, such as for providing a reshipper function, as for storage and transport.

A further object of the invention is the provision of such a container which utilizes materials which allow graphics, trademarks, logos, universal price and product codes and various other matter to be printed easily, reliably and effectively on encapsulating film or structural components of the container.

It is further an object of the invention to provide a method of producing a container of the invention, which method is economical, easily carried out by utilization of existing technologies or ready modifications thereof, which provides marked economy and throughput, and which can be carried out with the highest degree of automation.

Other objects and features as well as features of the invention will be in part apparent and in part pointed out hereinbelow.

BRIEF DESCRIPTION OF THE DRAWINGS

FIG. 1 is a vertical cross section showing container elements including a structure for receiving an encapsulating sheath for forming a vessel within the structure in accordance with the invention, depicting the orientation of separate structure and sheath components of the container during an initial step of the process of making the container.

FIG. 2 is a vertical cross section through a completed container of the invention after completion of the container-forming procedure which was shown initiated in FIG. 1, and including a closure in place at the upper end of the container.

FIG. 3 is a vertical cross section like FIG. 1 but showing an alternate configuration of components and their relationship during an initial step during the process of making the container.

FIG. 4 is a vertical cross section of a completed container provided in accordance with the arrangement of FIG. 3, and including a membrane-type closure.

FIG. 5B is a vertical cross section of a variation of the container of FIG. 5A but including a nonrigid pouch-form vessel within the container structure.

FIG. 8 is a vertical cross section of an alternative version of a container of the invention, including discrete inner and outer film layers relative to a structural component of the container, which layers are joined and serve an integral relationship with a double-seamed closure of the container, the container being used for containment of beverages and the like.

FIG. 9A is an enlarged fragmentary cross section of wall and closure components of the container of FIG. 8.

FIG. 9B is an enlarged fragmentary cross section of a variation of the closure components for the container of FIG. 8.

FIG. 10 depicts a container of the invention having a vessel formed by a film within a structure component with lap-seal closure of the vessel-forming film beneath the structure and provided with a solid plastic closure at the upper end.

FIG. 11A is a perspective view, partially sectioned vertically, illustrating a container of the invention provided with two separate compartments, and including separated vessel and structural components, the container being shown with a closure.

FIG. 11B is a fragmentary vertical cross section showing a modification of the container of FIG. 11A which includes a certain absorbent pad.

FIG. 12 is a further embodiment of a container constructed in accordance with the invention to provide a reshipper-type configuration.

FIGS. 13 and 14 are fragmentary vertical cross sections showing variations in the constructional features of the container of FIG. 12.

Corresponding reference characters indicate corresponding parts throughout the several views of the drawings.

DESCRIPTION OF THE PREFERRED EMBODIMENTS

Figure 7A:
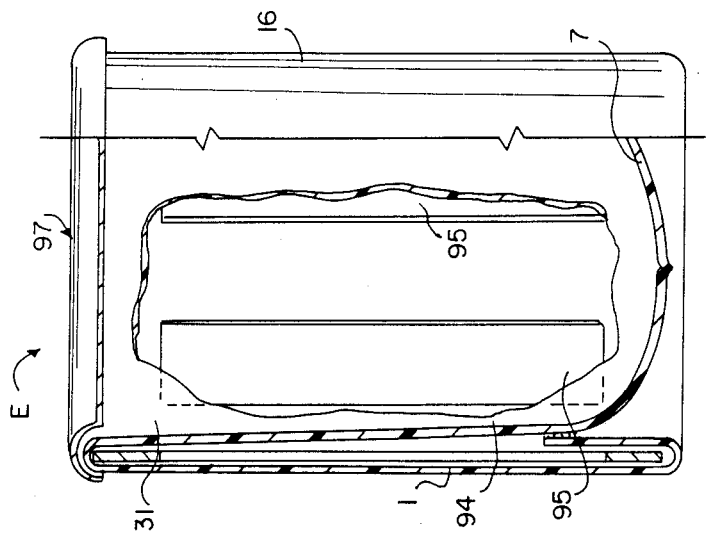
FIG. 7A is a partially sectioned elevation view of a further version of a container of the invention, including a certain area-relieved structural component of the container.

Referring now to FIGS. 1 and 2, there is provided a container designated generally A by use of a procedure initiated as shown in FIG. 1, in which a cylindrical tube 1 of film material is extended over the length of a tubular structural component 3 which also is of tubular configuration and, for purposes of uniformity, film element 1 is hereinbelow referred to as a sheath or capsule and cylindrical element 3 as a sleeve. Sleeve 3, which is to become the structural element of the container to be formed, is formed of any of various low-cost materials discussed below, while tube 1 is of much thinner polymeric barrier material (described hereinbelow) which will be utilized to barrier-encapsulate, in effect, sleeve 3.

For this purpose, an upper end of sheath 1, which may be drawn from a cast, blown, extruded, laminated or rolled length of tubular film material, is cut and sealed across, as by heat sealing to provide a fin-type seal 5 which closes what is presently the upper end of the sheath. Such upper end, as designated at 7, is shown partially folded inwardly of the sheath, by folding of the sheath inwardly upon itself, and is then introduced into the interior of sleeve 3 as, for example, by use of a suitable mandrel 9. Other ways of introducing the sheath are by blowing it in with gas pressure or using vacuum or partial pressure to pull it in place. The opposite end of sheath 1 provides a margin 11 extending below the lower end of sleeve 3. Suitable means (not shown) may be utilized to grip and maintain elements 1 and 3 and maintain the relationship as shown while the end 7 of sheath 1 is introduced into sleeve 3. Pressurized air, as introduced by nozzle means 13, may be utilized for maintaining sheath 1 in a semi-inflated, erect orientation as so depicted, by causing positive pressure within sheath 1. In any event, mandrel 9 is moved downwardly into sleeve 3, to introduce within the sleeve a tubular portion of sheath 1 which is designated in its entirety by reference character 15. A further tubular portion 16 is external of sleeve 3 and drawn tightly thereabout in closely-conforming relationship. It remains externally thereof for total encapsulation of the sleeve, as seen in FIG. 2. This length 15 is preselected to be slightly less than the overall height of sleeve 3.

After insertion of mandrel 9, the closed membrane end 7 of sheath 1 is at the positioned shown in FIG. 2. Suitable means (not shown) is then utilized for folding in to the bottom end of sleeve 3 the marginal portion 11 of sheath 1, interposing said marginal portion 11, which is then bonded to the structure as by adhesive 25 (as explained hereinbelow). Then, the inner portion of sheath 1 is inserted and bonded to the marginal portion 11 which is now (as shown) between the now inner portion 15 of sheath 1 and the interior surface of sleeve 3. As will be apparent in FIG. 1, sleeve 3 is provided at its lower edge or margin an inwardly directed curl 18, and said inward folding of sheath marginal portion 11 causes the same to be extended around curl 18, as shown in FIG. 2. A bond 20, as provided by heat sealing or a suitable type of adhesive compatible with the material of which sheath 1 is formed, is provided for causing a sealed relationship to be established between the lower end of sheath portion 15, which is seen to form a corner 21 with the closed end 7, causing the corner and lower marginal portions of sheath portion 15 to be joined to the inwardly-folded sheath portion 11. Further adhesive securement is preferably utilized in the formation of container A. Referring again to FIG. 1, a band 23 of adhesive is provided between the inner surface of sheath portion 16 and the outer wall surfaces of sleeve 3, but such adhesive may instead be in the form of multiple bands, stripes, dots or otherwise formed, and extends over only a small portion of the wall surface of sleeve 3 or a major portion thereof, being used to adhesively secure sheath portion 16 to the outer walls of sleeve 3 for maintaining a precise inter relationship between them. Dots, bands or stripes of adhesive, as band 25, are provided between the inner walls of sleeve 3 and outer surface of inwardly-directed sheath or sheath portion 15 (FIG. 2) for adhesively securing the inner portion 15 within sleeve 3 in the completed encapsulated version shown in FIG. 2.

The completion of formation of sheath 1 about sleeve 3 provides or defines a contents-receiving vessel within structure or sleeve 3, constituted by sheath portion 15 and the closed end or floor 7, such vessel opening upwardly.

Subsequent to the completion of these steps providing an encapsulation of sleeve 3, container A may be provided, after filling with product, with a closure 27 for closing the opening of the vessel thus defined. In this version closure 27 may be of the so-called "EZ-open" type having a raised flange 29 with an inner shoulder 31 and flanged outer rim 32 with enough width to receive the thicknesses of both outer and inner layers 15, 16 and also the wall thickness of structure 3. Flange 29 rests upon an upper rim 34 defined by the encapsulating material of sheath 1 where it is wrapped over the upper edge of sleeve 3. Closure 27 includes an opening pull tab 35. The closure may be secured by thermal or ultrasonic or adhesive bonding to upper film edge 34 and adjacent marginal film portions.

Closed end or floor 7 is spaced above the lower periphery 37 of the container, giving clearance which is protective of the closed end 7, which optionally be created in such a way (as by prevention of stretching thereof or by other treatment) so as to be of slightly greater thickness than the inner wall provided by sheath section 15 or its outer extend 16.

Sleeve 3 may be formed of various possible materials, such as paperboard, wound spirally or convolutely, or die-cut and formed, and may be single-ply or multi-ply. These are very inexpensive materials as they are made from paper, i.e., a semisynthetic product made by chemical processing of cellulosic fibers from various possible sources including soft woods but also sometimes hard woods as well as other raw organic materials, including flax, bagasse, straw, and so forth. Such paper-based material offers an environmental advantage, as it may be recycled and re-used due to its organic nature, provides unobjectionable waste products, and is both incinerable as well as biodegradable.

Structure 3 may also be advantageously formed of virgin or scrap or recycled polymeric material such as PE, PP and PET, and may in general be a single polymer or mixed or commingled polymers, or several layers of polymers. Structure 3 may particularly be of material or materials which can be recycled time and time again in the packaging industry. Such materials have heretofore not been practical for use in food containers, as not meeting food grade container specifications or regulations, but constitute an effective and practical material in the present container because structure 3 is encapsulated by sheath 1.

Whether polymeric or paper-based, the material employed for sleeve 3 may be what is herein defined and termed as barrier-requisite. i.e., for economy it may most advantageously be what is herein referred to as non-virgin, non-food grade specification, which is for example an attribute of recycled plastics (such as scrap PE) or of paper-based materials which cannot be used without a protective barrier layer for direct contact of food products or like contents of the container herein described. Thus, it must be barrier-protected before use for the container herein described. The structure may, however, be of virgin materials which could have barrier properties, such as PET. In addition, commingled plastics can be used for forming structure 3.

The thickness of sleeve 3 is preselected to provide adequate strength for protection of the product during the stresses normally encountered during the life of the container, and may be single or multiple layers, the thickness and number of layers being dependent upon the material chosen, whether paper-based or polymeric. If paper-based, thicknesses of sleeve 3 may exemplarily be within the range of about 0.005–0.080 in. (0.125–2.0 mm.).

Alternatively, it is possible to utilize other materials including metal, such as steel or aluminum, or glass, as well as low-cost composites of various materials. A typical thickness, if a polymeric material is used, is in the general range of 0.005–0.060 in. (0.13–1.5 mm.) for containers in the general range of a few ounces to 64 oz. (2 liter). As an example a wall thickness of 0.015 in.

(0.38 mm.) can be used for a 12-ounce (0.4 liter) frozen concentrate container.

Sheath 1 may be formed from various possible materials, heretofore identified, including polymeric extruded, coextruded, cast, blown or laminated sheet and film material such as polyolefins, polyesters, nylons, and coated cellophanes. Some of the high barrier films which can be used in conjunction with these groups are commercially available under the designations "EVAL" (or "EVOH"), the sarans and certain resins available under the trade designation SELAR. Olefinic polymers which can be used, for example, are high density polyethylene (HDPE), ultra high molecular weight polyethylene (UHMWPE), polypropylene (PP) and oriented polypropylene (OPP), polystyrene (PS), high-impact polystyrene (HIPS), various copolymers and terpolymers such as acrylonitrile butadiene-styrene (ABS), high nitrile barrier resins including styrene acrylonitrile (SAN), "BAREX" polymer and polyethylene terephthalate (PET and PETG). Moreover, there have been a combination of materials with mono-layers and other low barrier materials, such as low and high density polyethylene (LDPE, HDPE). As other barrier materials, there may specifically be used PET film (MYLAR) and polyvinylidene chloride (PVDC). Other possible sheath materials having barrier properties include foil, foil/polymer combinations, and metallized polymer films. Paper materials, treated and coated with suitable barrier-forming polymeric materials may also be used, including paper suitably laminated with such barrier materials.

The film material to be employed in the formation of sheath 1 may in general be in the range of about 3 microns to 0.030 in. (0.25 mm), depending upon the application for the container, and may be chosen from combinations of such materials, as for example, laminated to include an outer carrier layer of PE, PS, or PP, e.g., as of 0.001–0.010 in. (0.019–0.188 mm.), a barrier layer of material such as EVAL or Saran or SELAR having a thickness as low as 0.0005 in. (0.013 mm.) but more preferably about at least 0.001 in. (0.025 mm.), and then an opposite outer carrier layer again of PE, PS or PP. with suitable "tie" layers between the carrier layers and the sandwiched barrier layer. Such barrier layer may be slightly thicker, as well, such as up to about 0.004 in. (0.102 mm.) for the most barrier-requisite food products, but most preferably not more than about 0.0005–0.003 in. (0.0125–0.076 mm.) as an upper thickness extent, while either or both carrier layers may approach zero thickness. The so-called tie layers may be of a thermoset adhesive material as heretofore used for tying together co-extruded or laminated polymers.

In any event the film material, which may be monolayered or multilayered, one material or multimaterial, to be utilized for sheath 1, must have its barrier or nonbarrier properties selected in accordance with the product to be contained. Such films may be cast, blown, extruded, laminated or otherwise drawn and provided in accordance with known technique. For these purposes the terminology of "high barrier" employed herein means that the polymeric film sheath or vessel material, if to provide a barrier in accordance with this invention, must either be of a material having barrier properties, or have a barrier layer therein with such barrier properties, such that, as used, it will exhibit an oxygen permeability of not greater than 1.0–1.5 cc/mil/100 sq. in./24 hr. at 72° F. (0% relative humitidy), a water vapor permeability of not greater than 4.0–5.0 g/mil/100 sq.in./24 hr. at 100° F., 90% relative humidity, or, if used for containing carbonated liquids, a $CO_2$ permeability of not greater than 20.0–25.0 cc/mil/100 sq.in./24 hr., or a combination of such specifications.

It is not necessary that the thickness of such film utilized for the formation of the sheath be uniform. For example, the film's thickness of portions 15, 16 may be relatively greater in their upper regions than in the lower regions. For example, an upper wall thickness may be within the general range of 0.020–0.030 in. (0.51–0.76 mm.), while the thickness at the lower end might be as little as 0.005–0.010 in. (0.13–0.25 mm.).

It is not necessary that the film be restricted to a single or multiple layers of the same material. Instead, it may be a laminate having different material layers, such as aluminum foil carrying polymeric layers on one or opposite sides including tie layers or adhesive between the same, whereby only one layer may be in the strictest sense effective as a barrier layer.

It is also within the scope of the invention to vary the consitution as well of the thickness of sheath sheath 1 from one end to the other, as by stretching or by coextrusion technique suited for this purpose, whereby the thickness and/or constitution of extents 15 and 16 will be different.

Regardless of the various film materials which may be utilized for the formation of the sheath the latter completely encapsulates and encloses structure 3, the sheath being bonded not only to itself but also to the structure so that the structure is nowhere exposed to the food or other product to be packaged in the container, and so that the product is not exposed to an outside environment in which there may be contaminants, dirt, gases or high moisture. So also, the structure is protected against outside contamination, and notably adverse influences such as water and water vapor in high moisture environments.

Closure 27 may also be formed of materials having the above-mentioned barrier properties, such as for example of foil-polymer laminated construction, and will be of substantially greater thickness, for purposes of strength, than the film material used for sheath 1.

Referring to FIGS. 3 and 4, a modified process of making the container provides another embodiment B. In FIG. 3, sheath 1 is formed of film material as in FIG. 1, having been first closed in membrane configuration at one end 37, as by a fin seal 38 or using another kind of seal such as overlap. A tubular portion 15 of the sheath is inserted as by suitable means such as air jet 13 into the sleeve with the closed end 37 being spaced from a bottom edge formed by an outwardly directed fold or curl 40. A similar curl 41 is provided at the upper end. A band of adhesive 43 is provided between the inner walls of sleeve 3 and outer surface of sheath portion 16. The extent of said adhesive and form of application may be varied, as for example, by utilizing spots, stripes or spraying of the interior surfaces of sleeve 3 in tightly conforming relationship.

Next, by suitable means (not shown) an upper extent of sheath 1 and marginal portion thereof are folded down about the outside of sleeve 3 until occupying the position shown by phantom lines in FIG. 3, wherein portion 11 will extend below the curled lower periphery of sleeve 3. A band of adhesive 45 is then applied to the marginal portions of the lower end of sleeve 3, as shown, for ultimate adherence of film portion 11. Stretching and elongation of sheath 1 may occur, and particularly stretching of section 15 when the sheath is pulled outwardly along the exterior of structure 3.

Next, portion 11 is sealed and closed, as by suitable means, and the closed end inserted and pressed upwardly into the open lower end of sleeve 3 to provide a lower closed end 47 which is spaced slightly upwardly of the lower end of structure 3 and sealed to the marginal portions by means of said band of adhesive 45 to enclose and thus encapsulate fully the structural sleeve. Accordingly, structure 3 is now at least liquid sealed and may under certain circumstances be considered effectively hermetically encapsulated by the film material. Although membrane closing 47 could be joined, as by heating sealing, to the lower end 37 formed by the closing of the other end of the sheath, it is preferred that such closed or sheath end portions 37, 47 not be joined, so that the lower end 37 of portion 15 takes on cup-shaping as shown with the result of forming a cup-shaped vessel within the structure provided by sleeve 3, and with the lower end or floor of sheath portion 16 being spaced above the closed sheath end 47. The same materials are utilized for sheath 1 and sleeve structure 3 as for version A, using the same barrier considerations requisite for the product. In both versions, sleeve 3 may be provided with various geometric and nongeometric variations in configuration, and the structure may be curled, flanged, straight-walled, as well as being tapered rather than cylindrical as shown. Sleeve 3 also may be folded inside or out, and the thickness thereof need not be uniform. For example, greater thickness may be employed for increased stiffness as in the vicinity of the upper end, facilitating application of a closure.

Version B is shown provided with a closure 49 of membrane type as formed, for example, of foil/polymeric material which is heat sealed or ultrasonically bonded to an upper periphery 50 of the film. A tear strip or tab 52 provides opening means for the closure. Closure 49 has barrier properties according to the previously stated criteria.

Figure 5A:
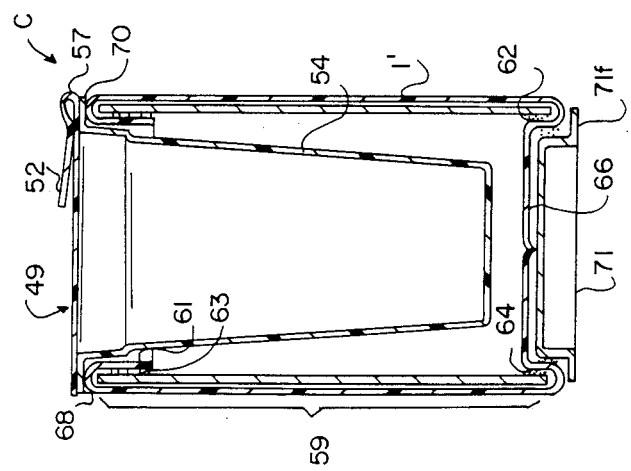
FIG. 5A is a vertical cross section of another version of the container including vessel fitted into a certain structure of the container, including a membrane-type closure.

Referring to FIG. 5A, a version C is provided by forming a separate insert to provide a discrete pouch or vessel 54 within sleeve 3. Vessel 54 is shown to be of generally cup-like, tapered-walled shape but not necessarily so configured. The vessel is supported therein by formation at the top of vessel 54 of a nesting-type rim 55 which is a radially outwardly extending horizontal flange 57 which rests within the sleeve. A modified sheath 1' of the above-mentioned film material is pulled tightly about the sleeve, and includes a an outer portion 59 in closely conforming relationship fully wrapping the exterior surfaces of sleeve 3, and short inwardly-directed portions 61,62 fitted into top and bottom of the sleeve and adhered by respective bands 63,64 of bonding substance at the upper and lower margins of the sleeve, but said portion 62 being formed by a closed, fin-sealed (or otherwise sealed) end 66 of the film material which is spaced inwardly from the lower periphery of sleeve 3 for protection.

The film material accordingly forms an upper peripheral rim 68 for receiving flange 57 to support the vessel. An annular seal 70 is then formed during manufacture to provide sealing of flange 57 to the film material. Seal 70 may be provided by heat-sealing, ultrasonic heating or the use of sealant or adhesive bonding materials. Closure 49, which may be of membrane type, is sealed to flange 57. A tear strip or pull tab 52 allows opening of the membrane closure 49.

At the lower end of the container, a protective base insert 71, as molded, for example from PE or other low-cost polymer, is fitted into the recess provided by the infolding of sheath margin 62. Insert 71 may preferably include a peripheral flange 71f which provides seating surface for the container, while protecting sheath 1' at the otherwise exposed lower end.

In the process of forming container C, sheath 1' is first fitted exteriorly of sleeve 3, its closed end 66 inserted and sealed (at 64), the upper margin 61 being folded inwardly and sealed (at 63), and vessel 54 then inserted and sealed (at 70) as just described, by which final step sleeve 3 is now encapsulated and isolated from the product.

Vessel 54 is formed of a requisite material such as barrier material appropriate for the product, for example, food or beverage, but it is of such thinness as to be only semirigid and strong enough for nested shipment and storage, with filling and closing occurring either before or after insertion into sleeve 3. Insert 54 may in fact be filled and retorted or autoclaved if of such semi-rigid configuration in wall thickness of 0.005–0.020 in. (0.13–0.51 mm.), with closure 49 applied thereto before insertion into film-enclosed sleeve 3.

Sleeve 3 is formed of the above-described material with thickness as applicable to versions A and B.

Insert 54 can be of thin vessel-forming metals as well as relatively thin glass, or material of monolayer or multilayer (e.g., 3, 5 or 7 layers, etc.) polymeric materials, the insert being itself inadequate to serve ordinarily as a container if used apart from the sleeve, as it would be incapable of surviving the normally-encountered stresses above enumerated. Just as examples, vessel insert 54 may be formed of thin molded barrier resins such as amorphous nylon known as "SELAR PA", or one such as "BAREX". The thickness and constitution of sheath 1' may be as in versions A and B.

FIG. 5B depicts a variation C' of the container of FIG. 5A but including a nonrigid pouch-form vessel within sleeve 3. Vessel, i.e., pouch 54' generally and approximately conforms to the interior of sleeve but is separately formed to include upper and lower closed ends 54a, 54b as created by suitable seals such as the fin seals 5a, 5b shown. A sheath 1" of the previously described film material, closed at the bottom as by a fin seal 5, is pulled tightly about the exterior of sleeve structure 3, and includes a an outer portion 59 in closely conforming relationship fully wrapping the exterior surfaces of sleeve 3, and short inwardly-directed portions 61,62 fitted into top and bottom of the sleeve and adhered by respective bands 63,64 of bonding substance at the upper and lower margins of the sleeve, with said portion 62 extending into the closed, fin-sealed end 66 of the film material which is spaced upwardly from the lower periphery of sleeve 3 for protection. Pouch 54', which may be inserted into the sheathed structure 3 only after filling (and possibly being first autoclaved, aseptically filled, or hot-filled), is dimensioned to provide at its upper end a peripheral margin 54m which will overlap and lie adjacent to the inwardly directed outer sheath portion 61, to which margin 54m is sealed by bonding substance s for providing a sealing relationsip with sheath portion 61, so that together with outer sheath 1', pouch 54' provides encapsulation of sleeve 3 which, as before, may be of non-virgin material which is intended to be recyclable and/or reusable. Between the inner wall of sleeve 3 and outer surface of pouch 54' is adhesive 25 as described with regard to FIGS. 2 and 4.

Closure 49, which may again be of membrane type, is sealed to the sheath material where it extends over the upper edge of structure 3. A tear strip or pull tab 52 allows opening of the closure.

Vessel 54' is formed of requisite material such as barrier material appropriate for the product, for example, food or beverage, and is only such thinness as to be appropriate to permit handling, insertion and bonding. It may have thinness considerably less than the outer sheath 1. Thus, pouch 54' may generally be of wall thickness of 0.00035–0.020 in. (0.009–0.51 mm.) as adequate to permit it to be filled and processed before insertion into film-enclosed sleeve 3. Pouch 54' may be of the materials described above with respect to previous embodiments A. B and C. Sleeve 3 is formed of the above-described material with thickness as applicable to versions A, B and C. An end cap 71 is provided as for version C of FIG. 5A.

Figure 6:
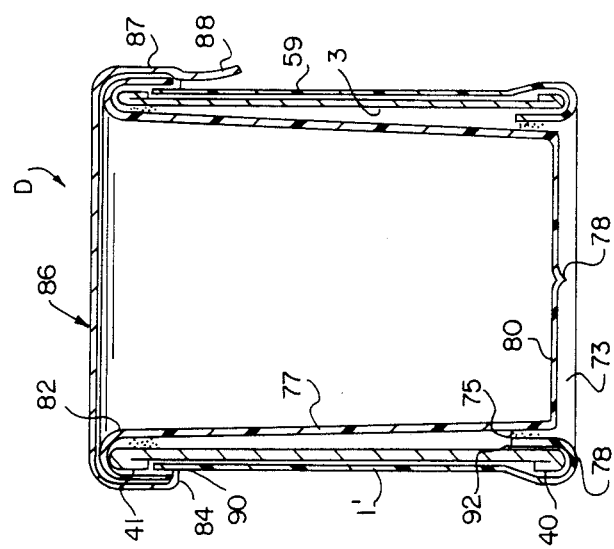
FIG. 6 is a vertical cross section of a modified form of the container utilizing different forms of layers or films internally and externally of the container, and including a different form of closure.

Referring now to FIG. 6, a further container D includes a sheath 1' of material like that utilized for version C to provide a tubular sheath portion 59 which extends substantially along the length of the outer periphery of sleeve 3, which is provided with outwardly-directed curls 40, 41 at its lower and upper ends. The upper periphery of sleeve portion 59 terminates proximate the outer edge or rim of curl 41 for purposes presently appearing, and the lower end extends continuously around the lower curl 40, to provide a lower edge 72 covered with the film material, but terminating in a short upwardly, inwardly directed sheath portion 73 which is bonded by a band of adhesive or other seal means, such as heat sealing or other bonding material, designated 75, to the lower periphery of an inner tubular film portion 77 which is sealed across one end, as by means of a fin seal 78 to provide a closed end or floor 80 of membrane-like type, and so that inner sheath portion 77 defines a vessel within sleeve 3. However, film portion 77 is not continuous with outer sheath portion 59, but instead is curled or formed over the upper sleeve curl 41 to provide a rim 82 which extends over curl 41 and along its length, slightly overlapping the upper part of a peripheral margin of outer sheath portion 59. This overlapping portion of inner sheath 77 is designated at 84. A closure of polymer/foil type or a flexible membrane type, designated generally 86, includes an outer rim 87 which extends over sheath portion 84 and may be sealed to sheath portions 82, 84, as desired. A tab 88 is provided for opening. A seal 90 is formed between sheath portion 84 and the overlapped margin of outer sheath portion 59, as produced by heat-sealing, adhesive material or other bonding substance. In the process of forming container D, sheath 1' may first be applied, specifically by drawing the tubular outer sheath portion 59 tightly about the periphery of sleeve 3, then pulling the material around the bottom of the sleeve as shown an 72 and inserting the lower margin 73 with a layer of adhesive 92 provided thereon or upon the inner lower marginal periphery of sleeve 3, to affix said portions 73 within the sheath. Then, inner sheath 78 may be inserted, as by use of a mandrel or air insertion technique (with closing or floor 80 having already been formed across the sheath as by heat sealing), and the outer sheath portion 84 next folded about the exterior of sheath portion 59 and adhered thereto at seal 90. Inner sheath portion 77 may be of flexible and/or semi-rigid material but also more preferably may be of ultra-lightweight material, such as to be of wall thickness inadequate to be used alone as a vessel or container for contents in the absence of the structure provided by sleeve 3. Floor 80 is spaced slightly above the lower periphery of the sheath material 72 for protection thereof.

The material utilized for sheath 1' and for the inner sheath 77 and its related elements, that is to say, all sheath-forming components of container D may be as described hereinabove with respect to embodiment A, and such materials considerations also apply to sleeve 3, which is seen to be fully encapsulated by the outer sheath 1' and inner sheath 77 by virtue of the bonding layers 75 and 90 which seal and encapsulate sleeve 3 in at least liquid-tight relationship, posing a barrier between the food products and the sleeve as well as protecting the sleeve against the outside environment. A possible variation is that the inner sheath 27 could be of virgin maerial while the outer sheath 1' could be either virgin or non-virgin/recycled material. Closure 86 may be formed of barrier or nonbarrier material as hereinabove described.

Referring now to FIG. 7A, an embodiment E demonstrates a container according to the invention wherein sheath 1 encapsulates a structure 3' which is shown to define a series of pillars 94 separated by large longitudinal open spaces 95 of rectangular configuration Thus, sleeve 3' has large relieved areas, but such need not be limited to rectangular shape or longitudinal extent, but instead may be circular, triangular, and various other geometric or nongeometric patterns in shape consistent with providing a very lightweight 3' with material present only to the extent as to preserve the strength and dimensional stability of the structure to be provided by sleeve 3. So also, sleeve 3 need not be of cylindrical configuration, but a tubular configuration is most preferred. Sheath 1 includes an outer extent 16 extending fully along the outer surface of sleeve 3' and an inner portion of 15 which is vessel-forming in character, and which terminates as a closed end 7 above the lower periphery of the sleeve. Sheath 1 is formed, as in previous versions, by extending it along and below the lower periphery of the sleeve or structure, and may include an extent directed upwardly into the lower end at least along a part of the length of the container for providing a recessed lower closed end, like that shown at 66 for version C (FIG. 5), or may extend directly across the lower end of the container generally as shown. A suitable closure 97 is applied and sealed, as appropriate, to close the container, and may be of barrier or nonbarrier material, as requisite. Sheath 1 and structure 3' are of the materials described hereinabove.

Figure 7B:
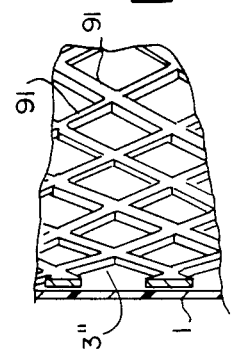
FIG. 7B is a fragmentary sectional view of a container like that of FIG. 7A but showing a modification of the structural component to provide a lattice-like configuration.

Referring now to FIG. 7B, a modification of the container of FIG. 7A provides a structure designated generally 3" formed of lattice-like configuration to provide a pattern of interconnected ribs 99 of very lightweight character providing openings of parallelogram shape. The grid-like perforated mesh pattern is sufficient for providing strength and dimensional stability but minimizes absolutely both weight and the amount of such material used. Sheath 1 fully encapsulates structure 3" and is vessel-forming therein, in the same manner as embodiment E. Materials of sheath 1 and structure 3" are as identified hereinabove for embodiment A.

FIG. 8 shows a beverage container version F with a sheath 101 enclosing and encapsulating a structure 103 of can-forming character generally, including conventional side walls 105, an upwardly convex floor 106 and a seating rim 107. Structure 103 has a narrowed mouth portion 108, formed to provide an outwardly directed curl 109 having beneath it a recess 110. Sheath 101 of film material as earlier described is drawn tightly about the exterior of structure 105, and extends from seating rim 107 along the full length of the structure, and terminates within said recess 110. In forming container F, sheath 101 may first be applied and adhered, as by heat-shrinking or the use of bonding or adhesive substances about the exterior of the structure, in tightly conforming relationship, to provide a lower necked base portion 111 and necked upper portion 113 which extends upwardly into recess 110, wherefor the version of FIG. 9A, sheath portion 113 is bonded to a corresponding portion 114 constituting a curled extension of a vessel-forming inner sheath 115 of requisite barrier material. Sheath 115 thus extends over the curl to provide a barrier-covered lip or rim 117. Inner sheath 115 may be bonded interiorly of structure 103 as by heat sealing or the use of bonding substances between the interior surfaces of structure 103 and exterior walls of the vessel-forming inner sheath. Bonding substance is shown at 119 in FIG. 9, 9A and 9B. So also, bonding substances may be used for securement of the outer sheath to the exterior of structure 103, and bonding substance is shown at 120 (FIG. 9) and at 121 (FIG. 8). However, if shrink-film material is used for the outer sheath, bonding thereof to the structure is obviated. Internal sheath portion 115 may be formed by blow-forming interiorly of the structure, as by use of two-step procedure including inserting a parison of the polymeric barrier resin, such as virgin PET, bonding it at the mouth of the structure, and then gas-blowing the parison into full shape against the internal surfaces of the structure with resultant film thickness of 0.00035–0.020 in. (0.009–0.52 mm.). The base of the structure includes a series of small apertures 122 within the structure floor for facilitating insertion and/or blowing of the internal sheath. A closure designated generally 123, such as of metal including a pull tab 124 or tab-top piercing device, may be provided for container F by formation to include a curl 126 which extends over lip 117 and the underlying vessel curl 109 to provide an under-turned lip 128 for tightly sealing the closure in place (FIG. 9A). Structure 103 is completely encapsulated internally by vessel-forming inner sheath 115 and, enclosed externally as well as by the outer sheath 101, except for seating rim 107, but it will be apparent that the outer sheath 101 may extend over and enclose as well seating rim 107. In the alternative of FIG. 9B, the inner and outer sheaths 115, 101 are formed continuously and curled under curl 126. Container F can hold carbonated beverages, such as soft drinks and beer, and may use a structure of recycled metal, glass or other non-virgin grade polymers. The thicknesses and materials are in accordance with the descriptions of other embodiments As in embodiments of FIGS. 5 and 6, the sheath material exteriorly and interiorly of the structure may be of different kinds. For example, PET film may be used internally for vessel-forming sheath 115, and a less expensive polymer with far less barrier protection provided exteriorly for sheath 101, which need not so much provide a protective function, but rather fulfill a primary function of labelling, decoration, and the presence of an excellent surface for printing indicia and designs.

FIG. 10 shows another container of the invention, designated embodiment H, in which sheath 1 is formed of film material of type and thickness as described in connection with FIG. 1. A tubular portion 15 of the sheath is first inserted, as by suitable means such as air jet or mandrel, into structure 3 having a closed bottom 3b. A suitable application of adhesive 25 as in the form of bands or stripes or spots, is provided between the tubular sheath portion 15 and structure inner wall for bonding portion 15 thereto. The sheath is then pulled downwarly about the outer surface of structure 3 and around its bottom 3b to provide a closed end 37 sealed in membrane configuration, as by a lap seal 38'. Bands or other suitable applications 23 of adhesive are provided between the inner walls of sleeve 3 and the outer surface of sheath portion 3. The extent of said adhesive and form of application may be varied, as for example, by utilizing spots, stripes or spraying of the relevant surfaces. Thus sheath 1 is adhered in tightly conforming relationship to the structure, and its portion 15 is vessel-defining within structure 3. Accordingly, structure 3 is now at least liquid sealed and may under certain circumstances be considered effectively hermetically encapsulated by the film material. The same materials are utilized for sheath 1 and sleeve structure 3 of version H as for version A, using the same barrier considerations requisite for the product. Further, sleeve 3 may be provided with various variations, such as for example the thickness thereof need not be uniform. For example, greater thickness may be employed for increased stiffness as in the vicinity of the upper end, facilitating application of a closure. Version H is shown provided with a closure 49 of solid type as formed, for example, of molded polymeric material and having a peripheral raised flanged rim 49r suitably sealed or ultrasonically bonded, etc., to an upper periphery 50 of the film. A or tab 52 provides opening means for the closure, which may have barrier properties according to the previously stated criteria. Because of the encapsulation of structure 3, it may be of non-virgin material and may be reused or recycled.

FIG. 11A indicates the applicability of the invention to a markedly different type of tray container as a version indicated generally G, in which a sheath 201 of thin film polymer encapsulates a structure 203. Said structure is of generally rectangular tray configuration, but may be circular or oval or square, etc. It defines a pair of separate compartments 205a, 205b, but there may be only one or another number, such as four, of such compartments. The structure is of paper-based or polymeric material, of the types hereinabove described, or may be of aluminum or steel foil, or glass, and is shaped as by thermoforming, molding or pressing into tray-like configuration, including sidewalls as at 207 having outwardly extended horizontal flanges 208 and an internal raised wall or divider 210 which includes an upper surface 212 which is at the same level as, or slightly recessed relative to, flanges 208. Moreover, structure 203 is provided with a plurality of circular apertures 214 which could, however, be of other shapes, to provide area relieving for lightening of the structure and conservation of material. Such openings are spaced at random or periodic intervals throughout the bottom surface or flat floor, as designated 215.

Sheath 201 completely encloses structure 203 and may be formed by providing an upper portion 217 which is extended into the compartments and therein fixed by bonding means, such as heat-sealing or bonding substances, as designated at 219. Such portion may be part of a larger sheath which is then wrapped around the flanges 208, and pulled below structure 203 and formed below and in close conformance with structure floor 215 to provide a lower portion or film surface 221. For example, lower portion 221 may be formed by folding together and lapping edges of the sheath of film material after it is pulled beneath the closure, and the same may also be formed in place by the use of a molding technique. Bonding is provided between the lower film portion 221 and outer surfaces of structure floor 215, a designated at 223 and between such lower film portion and the sidewalls 207, as designated at 224. By use of molding technique, the lower film portion 223 may also be pressed or formed into the structure internal walls 212, as shown at 225. The film material may be of the type hereinabove described, and generally of the thicknesses comprehended for packages in accordance with versions A through F. A closure 227, of film material, or foil or film/foil membrane type material, having curled edge flanges 228 is placed on the container after filling with contents, and preferably bonded to the upper vessel-defining film portion by heat sealing or other bonding substance, as at 230 above the vessel outer flanges and also at 231 where the cover rests upon and is now adhered to the film material where it passes over the internal wall 210 to provide a wall-defining sheath interval.

FIG. 11B shows a version G' of the tray container, including an absorbent pad 233 overlying the structure forming the tray compartments (e.g., 205a) and located between the structure and the sheath material 201. Pad 233 is preferably formed of paper or other cellulosic material of highly absorbent nature such as will readily accept meat juices or other liquids released by food products held in the container, as for example, raw poultry or beef, etc., contained therein as for sale in food stores, or cooked foods, such as sandwiches, fried foods, etc., for restaurant sale. The sheath material has minute perforations, as at 235, at regular intervals to permit drainage of the juices or other liquids from the compartments into the absorbent material of pad 223.

FIG. 12 demonstrates a reshipper-type container J for food products and like contents. Such a container is used for the shipment of produce, fresh fruits, as well as reshipment of comminuted or loose-fill products, as well as other boxed or pre-packaged goods or small comestibles. A film sheath having inner and outer portions 301 and 302 is used to encapsulate a structure 303 of solid or, as shown, perforate configuration, such as formed of paperboard or other virgin or non-virgin polymeric or paper material, which must be isolated from the product. Consequently structure 303 may be of non-virgin recycled paper, PP, PE, PET or PETG. Large triangular relieved areas 305 are shown, leaving pillars 307 and cross-braces 309. Other relieved-area shaping is possible. A continuous rim 311 extends around the upper periphery of structure 303 and similarly a continuous bottom edge or rim 312 is provided.

The sheath or film material for sheath-encapsulating the structure is of suitable polymeric or foil/polymer such as materials of the type hereinabove discussed. Such material is applied by forming the inner sheath portion 301, including shaping same to provide a floor 316 and causing same to be bonded internally of the structure to a floor 317 thereof as by use of bonding or other substance as at 318, and then folding an upper marginal edge portion of the inner sheath out and over the upper structure rim 311 and bonding it to exterior surfaces of the latter by adhesive 322 or by use of other bonding technique. The sheath is then folded beneath structure 303 and suitably bonded to it in the same manner, and may be closed by lap sealing or fin sealing as shown in FIG. 10, for example.

Thus, the sheath portions 301 and 302 together define a vessel-defining contents-receiving element for physically containing and protecting the product, providing a barrier between the structure and contents and whereby, because of the thin-walled character of the film material, such vessel would not be useful alone as a container for the contents in the absence of structure 303. That is to say, the film material may be quite thin as above noted, and reliance is had upon structure 303 to provide the physical strength for protecting the contents against the stresses typically to be encountered during shipment and use as, for example, by grocery wholesalers and retailers.

A closure 324 is provided for covering and completing the new container H. Referring additionally to FIGS. 13 and 14, cover 324 may be of different forms. Thus, in FIG. 14, cover 324 includes a flanged downwardly-directed rim 325 whose lower edge is directed slightly inwardly for providing securely closed or sealed relationship with the outer sheath layer 302. A layer of sealant or other bonding substance 327 optionally may be provided internally of the rim 325 for enhancing the sealing of the container. Cover 324 as shown in FIG. 14 may be integrally formed of single thickness material, such as low cost polymer or instead, as shown in FIG. 13, cover 324 may instead be formed of a paper-based or polymeric or cellulosic structural core 324c material encapsulated with a film 324f in the same manner as disclosed above for the main container body.

FIG. 14 shows an alternate construction in which the structure, designated 303' is formed of corrugated paperboard material including a core 303c and face layers 303f, is encapsulated by the film material layers 301 and 302.

Structure 303 can alternatively be of tubular character having an open top and bottom, the bottom being closed by a closure of one of the above-described types or otherwise sealed by the encapsulating material.

In view of the foregoing, it will be seen that the several objects of the invention are achieved and other advantages are attained.

Although the foregoing includes a description of the best mode contemplated for carrying out the invention, various modifications are contemplated As various modifications could be made in the constructions and methods herein described and illustrated without departing from the scope of the invention, it is intended that all matter contained in the foregoing description or shown in the accompanying drawings shall be interpreted as illustrative rather than limiting.

What is claimed is:

1. A material-recyclable container for safe packaging of food-grade contents, namely food, beverage and other food-grade consumable products, by use of recyclable non-food-grade material in protected barrier relationship with such contents while permitting recycling of such container for subsequent reincorporation by recycling, said container comprising a structure and a vessel within the structure for receiving contents of such character, characterized by:

the structure providing a vessel-and-contents-receptive configuration and for protecting the vessel and the contents against the stresses of processing, filling, warehousing, distribution, merchandising and customer use, the structure being formed of single or multiple thicknesses of at least one recyclable non-food-grade material to be encapsulated in safely protected relationship with said contents, the recyclable material being of the type to which the contents are not safely to be directly exposed, a sheath of virgin food-grade film material having preselected barrier properties for encapsulating the structure to provide said protected relationship for the contents, the sheath having portions extending externally over the entirety of the structure and at least partially internally thereof, the sheath portion internally of the structure defining said vessel within the structure for receiving the contents, the sheath interposing by said barrier properties a barrier between the structure and the contents and between the structure and the outside environment, the vessel having an opening, at least the vessel-defining portion of the film material having walls of thin-walled character each of total thickness inadequate if the vessel were used alone as a container for the contents in the absence of the structure, whereby the food-grade virgin material primarily is not employed for protection against said stresses, means bonding the vessel-defining portion of the film material at least internally within the structure, and a closure for closing the vessel opening, the closure also having barrier properties such that the closure closes off the barrier between the structure and the contents, whereby said container permits subsequent recycling and reincorporation of the materials of the container following said recycling for structural purposes in a further such container.

2. A container according to claim 1 wherein the structure is of paper-based material.

3. A container according to claim 2 wherein the structure is of recycled polymeric material.

4. A container according to claim 3 wherein the recycled polymeric material is PE, PP, PET or PETG.

5. A container according to claim 1 wherein the sheath includes a first tubular portion extending exteriorly the entire length of the structure, and a second tubular portion integral with the first tubular portion extending from one end of the structure internally thereof over at least a portion of the structure.

6. A container according to claim 5 wherein the second tubular portion forms the vessel, the vessel having a floor defined by a closed end of the second tubular portion, and the sheath includes a third tubular portion integral with the first tubular portion and extending from an opposite, lower end, of the structure interiorly of the structure, and bonded therein to said closed end.

7. A container according to claim 5 wherein the second tubular portion forms the vessel, the vessel having a floor defined by a closed end of the second tubular portion, the sheath including a third tubular portion integral with the first tubular portion and extending from an opposite, lower end, of the structure interiorly of the structure, and terminating therein in a closed sheath end extending across the structure below the vessel floor.

8. A container according to claim 1 wherein said preselected barrier properties are provided by at least one of the sheath portions exhibiting an oxygen permeability of not greater than 1.0–1.5 cc/mil/100 sq. in./24 hr. at 72° F. (0% relative humidity), a water vapor permeability of not greater than 4.0–5.0 g/mil/100 sq. in./24 hr. at 100° F., 90% relative humidity, or, if said contents are carbonated liquids, a $CO_2$ permeability of not greater than 20.0–25.0 cc/mil/100 sq. in./24 hr.

9. A container according to claim 8 wherein said at least one sheath portion is a polymer selected from the group consisting of "SURLYN" ionomeric resins, high density polyethylene (HDPE), ultra high molecular weight polyethylene (UHMWPE), polypropylene (PP), oriented polypropylene (OPP), polystyrene (PS), high-impact polystyrene (HIPS), acrylonitrile butadiene-styrene (ABS), styrene acrylonitrile (SAN), "BAREX" polymer and polyethylene terephthalate (PET and PETG), low and high density polyethylene (LDPE, HDPE), polyvinylidene chloride (PVDC), ethylene vinyl alcohol copolymer, and the amorphous nylon resin known as "SELAR PA", and combinations of materials of said group.

10. A container according to claim 1 wherein the structure is defined by a tubular member having relieved areas therein.

11. A container according to claim 1 wherein the structure and is of tray-defining configuration, said structure defining at least one compartment having a floor, the compartment floor having apertures therein.

12. A container according to claim 1 wherein the structure and is of tray-defining configuration, said structure defining at least one compartment having a floor, the container further comprising a layer of absorbent material overlying the floor, the sheath portion internally of the structure overlying the floor and having apertures therein to permit liquid from the contents to be drained from the compartment and absorbed by the absorbent material.

13. A container according to claim 1 wherein the structure and vessel each define a plurality of separate compartments, the cover covering and providing access to each of the compartments, the sheath having portions internal to each of the compartments, said internal portions being integrally joined one to another at least one compartment internal wall-defining interval which is bonded to the cover.

14. A container according to claim 11 wherein the structure defines at least one internal raised wall between adjacent compartments, the wall-defining interval of the sheath passing over the wall.

15. A container according to claim 12 wherein the structure is defined by a member having relieved areas therein.

16. A container according to claim 1 wherein the sheath portion internally of the structure is a discrete insert which is bonded to the film material portion externally of the structure.

17. A container according to claim 1 wherein the sheath portion internally of the structure is a pouch of said film material.

18. A container according to claim 1 further comprising an end cap fitted to a lower end of the container and bonded to said sheath material at the lower end of the structure.

19. A container according to claim 16 wherein the sheath portion internally is of a first type material, and the sheath portion externally is a different type material.

20. A material-recyclable container for safe packaging of food-grade contents, namely food, beverage and other food-grade consumable products, by use of recyclable non-food-grade material in protected barrier relationship with such contents while permitting recycling of such container for subsequent reincorporation by recycling, said container comprising a structure and a vessel within the structure for receiving contents of such character, characterized by:

the structure providing a contents-receptive configuration and for protecting the vessel and the contents against the stresses of processing, filling, warehousing, distribution, merchandising and customer use, the structure being formed of single or multiple thickness material to be encapsulated in safely protected relationship with said contents, the recyclable material being of the type to which the contents are not safely to be directly exposed, a sheath of virgin food-grade polymeric film material having preselected barrier properties for encapsulating the structure to provide said protected relationship for the contents with portions of the sheath extending externally over the entirety of the structure and at least partially internally thereof, the sheath portion internally of the structure defining said vessel within the structure for receiving the contents, the sheath portion internally of the structure interposing by said barrier properties a barrier between the structure and the contents and the sheath portion externally of the structure interposing by said barrier properties a barrier between the structure and the outside environment, the vessel having an opening, the vessel being formed of polymeric material which is at least semirigid to define side and bottom walls of thin-walled character and each of total thickness inadequate if the vessel were used alone as a container for the contents in the absence of the structure, whereby the polymeric material primarily is not employed for protection against said stresses, means bonding the internally extending sheath portion within the structure, and a closure for closing the vessel opening, the closure also having barrier properties such that the closure closes off the barrier between the structure and the contents, whereby said container permits subsequent recycling and reincorporation of the materials of the container following said recycling for structural purposes in a further such container.

21. A container according to claim 20 wherein the vessel is discretely formed and self-supporting, the vessel being inserted within the sleeve and bonded to the film barrier material.

22. A container according to claim 20 wherein the structure is of paper-based material.

23. A container according to claim 22 wherein the structure is of non-food grade polymer.

24. A container according to claim 20 wherein the structure is of recycled PE, PP, PET or PETG.

25. A container according to claim 20 wherein the sheath includes a first tubular portion extending exteriorly the entire length of the structure, and a second tubular portion integral with the first tubular portion extending from one end of the structure internally thereof over at least a portion of length of the structure.

26. A container according to claim 25 wherein the sheath includes a third tubular portion integral with the first tubular portion and extending from an opposite, lower end, of the structure interiorly of the structure and terminating therein in a closed sheath end extending across the structure below the vessel floor.

27. A material-recyclable reshipper-type container safe packaging of food-grade contents, namely for food, beverage and other food-grade consumable products, by use of recyclable non-food-grade material in protected barrier relationship with such contents while permitting recycling of such container for subsequent reincorporation by recycling, said container comprising:

A rectangular structure having bottom and side walls for providing a contents-receptive configuration and for protecting the container and its contents against the stresses of processing, filling, warehousing, distribution, merchandising and customer use, the structure being formed of material to be encapsulated in safely protected relationship with said contents, the recyclable material being of the type to which the contents are not safely to be directly exposed, a sheath of virgin food-grade polymeric film material having preselected barrier properties for encapsulating the structure to provide said protected relationship for the contents by means of the sheath including a vessel-defining contents-receiving first sheath portion extending internally of the structure for covering the internal surfaces thereof and including a closed end to provide a sheath floor internally of the structure, the vessel having walls of thin-walled character each of total thickness inadequate if the vessel were used alone as a container for the contents in the absence of the structure, whereby the polymeric film material primarily is not employed for protection against said stresses, means bonding the internally extending first sheath portion within the structure, the sheath including a second, outer portion extending externally of the structure for covering the structure opening and external surfaces thereof, said second portion having a lower margin drawn beneath the structure in sealing relationship, the sheath first portion interposing by said barrier properties a barrier between the structure and the contents and the sheath second portion interposing by said barrier properties a barrier between the structure and the outside environment, and a closure for said container, the closure also having barrier properties such that the closure closes off the barrier between the structure and contents.

28. A container according to claim 27 wherein said closure comprises a structural member encapsulated by polymeric film material, said structural member having inner and outer faces covered by the film material.

29. A container according to claim 27 wherein said closure is integrally formed of polymeric material and defines a flange fitting over at least upper marginal portions of the sheath outer portion.

30. A material-recyclable container for primary or secondary safe packaging of barrier protection-requiring contents by containment within barrier material while permitting recycling thereof as non-barrier material for subsequent incorporation by recycling into a similar such container, the container comprising a structure and a sheath forming a vessel within the structure for receiving such protection-requiring contents, the structure providing a vessel-and-contents receptive configuration for protecting the vessel and the contents against the stresses of processing, filling, warehousing, distribution, merchandising and customer use, the structure being formed of single or multiple thicknesses of at least one recyclable material to be encapsulated, said recyclable material being of non-barrier material as to preclude safe direct exposure of the contents thereto, the sheath comprising at least one layer of polymeric barrier material having preselected barrier properties encapsulating the structure to provide portions extending not only at least partially internally of the structure but also externally over the entirety of the structure for interposing by said barrier properties a barrier between the structure and the contents for preventing exposure of the contents to the structure, the sheath material defining with the structure vessel walls of such total thinness that the vessel if used apart from the structure would be unable to protect the vessel and the contents against such stresses of processing, filling, warehousing, distribution, merchandising and customer use, whereby the barrier material primarily is not employed for protection against said stresses, means bonding at least the vessel-forming portions of the film material internally within the structure, the vessel having an opening, and a closure for closing the vessel opening, the closure also having barrier properties such that the closure closes off the barrier between the structure and the contents, whereby said container permits subsequent recycling and reincorporation of the materials of the container following said recycling for structural purposes in a further such container.

31. A container according to claim 30 wherein vessel-forming portions of the polymeric barrier material constitute a nonrigid pouch internally of the structure.

32. A container according to claim 30 wherein vessel-forming portions of the polymeric barrier material comprise a first portion within the structure forming a discrete semirigid cup having a side wall surrounded by but spaced from a sidewall of the structure and a second portion extending externally of the structure in structure-surrounding relationship.

33. A container according to claim 30 wherein vessel-forming portions of the polymeric barrier material comprise a first portion within the structure forming a film liner for the structure having a side wall surrounded by and lying against a sidewall of the structure and a second portion extending externally of the structure in structure-surrounding relationship.

34. A container according to claim 33 wherein the structure has a closed bottom supporting a corresponding bottom of the film liner but the bottom of the structure is provided with at least one vent aperture by which insertion of the film liner into the structure is facilitated.

35. A container according to claim 30 wherein said preselected barrier properties are provided by the barrier material exhibiting an oxygen permeability of not greater than 1.0–1.5 cc/mil/100 sq. in./24 hr. at 72° F. (0% relative humidity), a water vapor permeability of not greater than 4.0–5.0 g/mil100 sq.in./24 hr. at 100° F., 90% relative humidity, or, if said contents constitute carbonated liquids, a $CO_2$ permeability of not greater than 20.0–25.0 cc/mil/100 sq.in./24 hr.

* * * * *

UNITED STATES PATENT AND TRADEMARK OFFICE
CERTIFICATE OF CORRECTION

PATENT NO. : 4,982,872
DATED : January 8, 1991
INVENTOR(S) : Donald J. Avery

It is certified that error appears in the above-identified patent and that said Letters Patent is hereby corrected as shown below:

Col. 23, line 7, replace "with" with --within--; and

Col. 24, line 24, replace "4.0-5.0 g/mil100 sq.in./24 hr." with --4.0-5.0 g/mil/100 sq.in./24 hr.--.

Signed and Sealed this

Twelfth Day of May, 1992

*Attest:*

DOUGLAS B. COMER

*Attesting Officer*     *Acting Commissioner of Patents and Trademarks*